United States Patent [19]
Takagi

[11] Patent Number: 5,917,268
[45] Date of Patent: Jun. 29, 1999

[54] VIBRATION DRIVEN MOTOR

[75] Inventor: Tadao Takagi, Yokohama, Japan

[73] Assignee: Nikon Corporation, Tokyo, Japan

[21] Appl. No.: 08/967,343

[22] Filed: Oct. 27, 1997

Related U.S. Application Data

[63] Continuation of application No. 08/706,962, Sep. 3, 1996, abandoned, which is a continuation of application No. 08/498,260, Jul. 3, 1995, abandoned.

[30] Foreign Application Priority Data

| Jul. 5, 1994 | [JP] | Japan | 6-153472 |
| Oct. 19, 1994 | [JP] | Japan | 6-253609 |
| Oct. 19, 1994 | [JP] | Japan | 6-253820 |

[51] Int. Cl.[6] .................... H02N 2/00; H01L 41/08
[52] U.S. Cl. .............. 310/317; 310/321; 310/323; 310/328
[58] Field of Search .................. 310/317, 321, 323, 328, 331

[56] References Cited

U.S. PATENT DOCUMENTS

| 3,531,742 | 9/1970 | Saito et al. | 333/72 |
| 3,873,947 | 3/1975 | Johnson | 333/72 |
| 4,727,278 | 2/1988 | Staufenberg et al. | 310/328 |
| 4,928,030 | 5/1990 | Culp | 310/328 |
| 5,073,739 | 12/1991 | Iijima | 310/323 |
| 5,418,418 | 5/1995 | Hirano et al. | 310/328 |
| 5,424,596 | 6/1995 | Mendenhall et al. | 310/328 |
| 5,448,127 | 9/1995 | Kanazawa | 310/323 |
| 5,453,653 | 9/1995 | Zumeris | 310/323 |

FOREIGN PATENT DOCUMENTS

| 0 424 609 | 5/1991 | European Pat. Off. | H01L 41/09 |
| 0277477 | 11/1988 | Japan | 310/323 |
| 0188169 | 7/1990 | Japan | 310/323 |
| 0045173 | 2/1991 | Japan | 310/323 |
| 3251088 | 11/1991 | Japan | 310/323 |
| 5091765 | 4/1993 | Japan | 310/323 |
| 5091766 | 4/1993 | Japan | 310/323 |

OTHER PUBLICATIONS

Tomikawa et al, "Piezoelectric Linear Motors For Application to Driving a Light Pick-Up Element," *Lecture Papers of 5th Electromagnetic Force Associated Dynamics Symposium,* Jun. 9, 1993, pp. 393-398.

*Primary Examiner*—Thomas M. Dougherty
*Attorney, Agent, or Firm*—Shapiro and Shapiro

[57] ABSTRACT

A vibration driven motor constituted by an elastic member and an electro-mechanical converting element connected to the elastic member is characterized in that the driving direction is changed by changing the frequency of a vibration produced by the electro-mechanical converting element. In this case, the driving direction preferably includes two orthogonal directions.

7 Claims, 7 Drawing Sheets

FIG. 1A  FIG. 1B
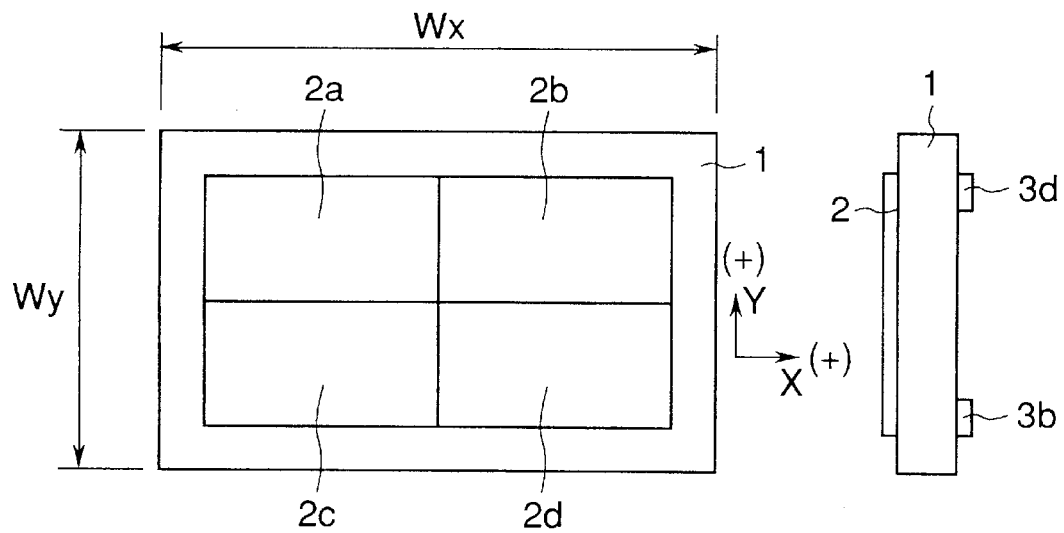
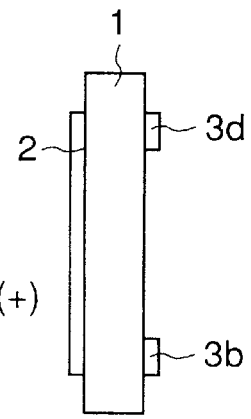
FIG. 1C
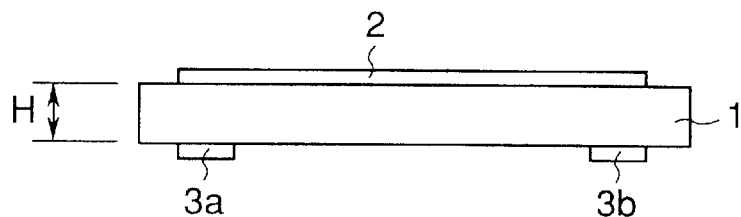
FIG. 1D
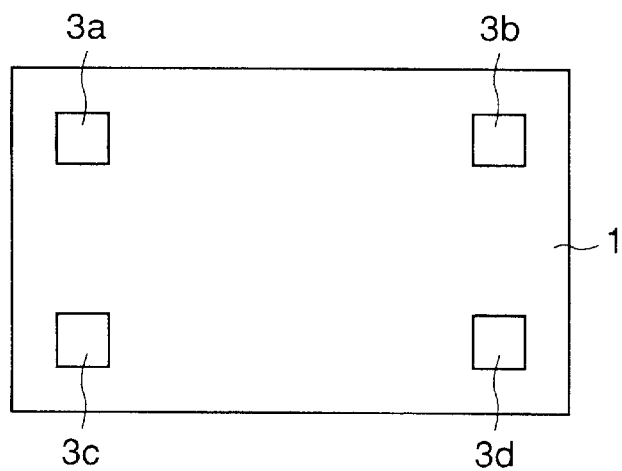

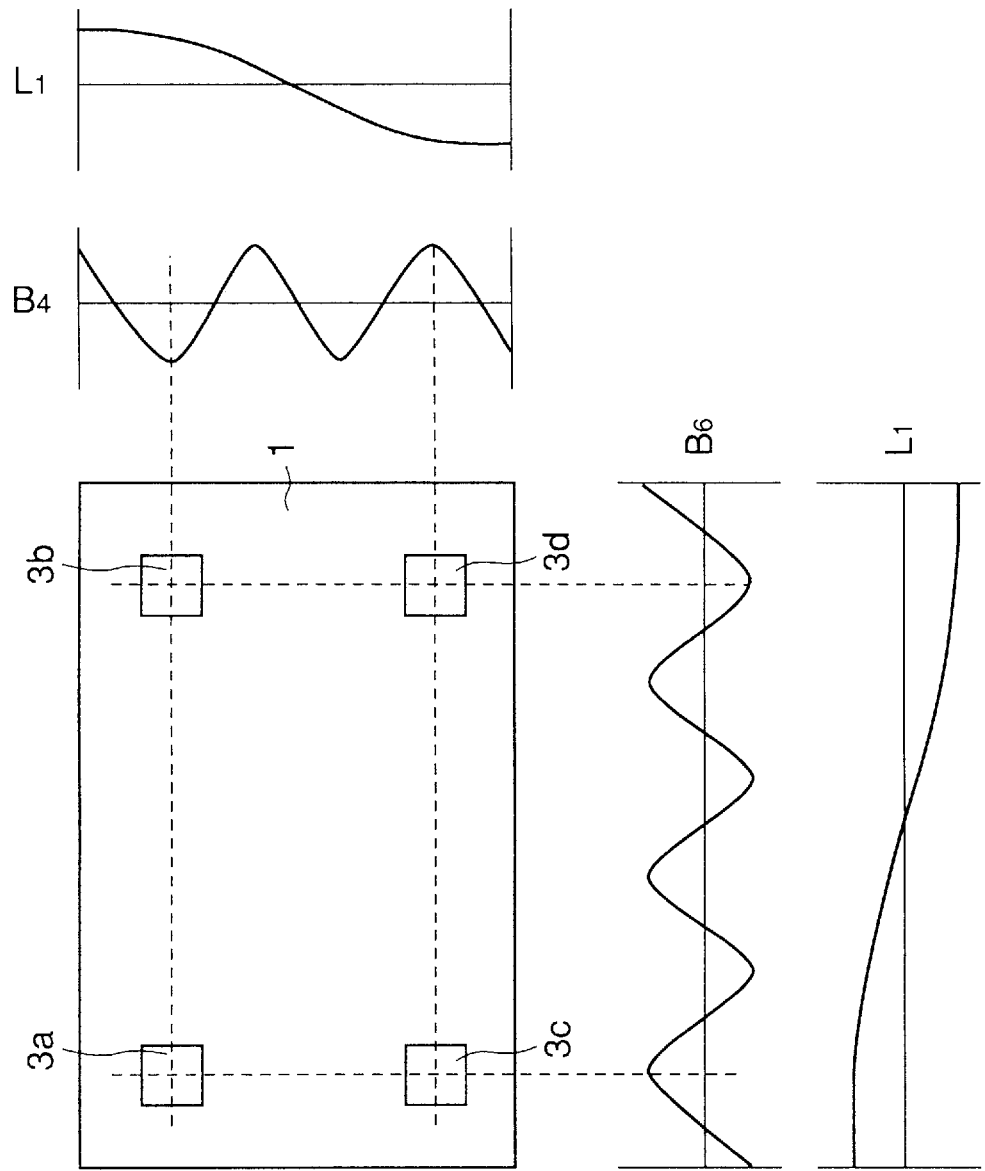

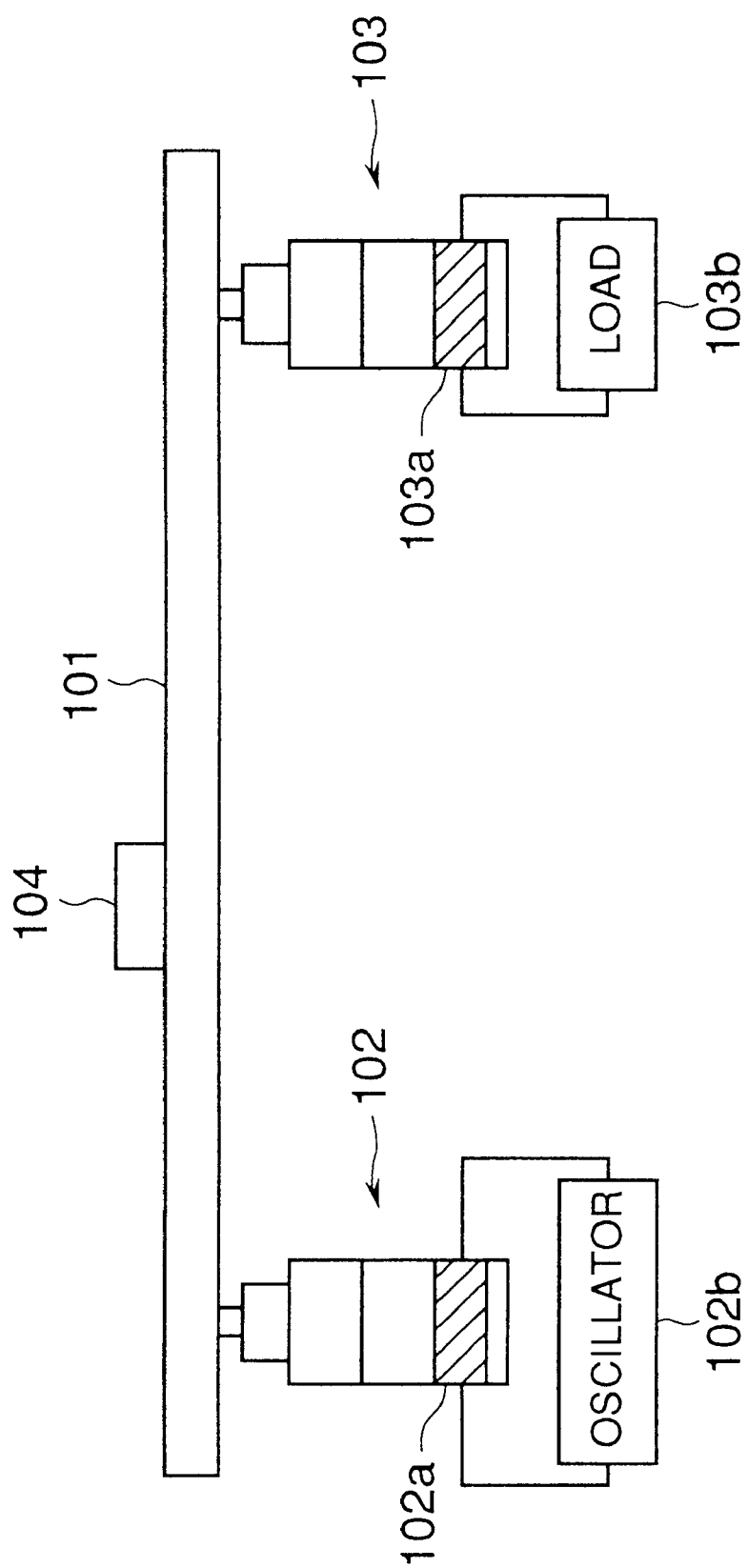

VIBRATION DRIVEN MOTOR

This is a continuation of application Ser. No. 08/706,962 filed Sep. 3, 1996, which is a continuation of application Ser. No. 08/498,260 filed Jul. 3, 1995, both now abandoned.

BACKGROUND OF THE INVENTION

1. Field of the Invention

The present invention relates to a vibration driven motor for obtaining a driving force by generating an elliptic motion in an elastic member.

2. Related Background Art

FIG. 4 is a view showing a conventional linear vibration driven motor.

In the conventional linear vibration driven motor, a vibration member 102 for applying a vibration is disposed at one end side of a rod-like elastic member 101, and a transformer 103 for controlling a vibration is disposed at the other end side thereof. Vibrators 102a and 103a are respectively coupled to the vibration member 102 and the transformer 103. An AC voltage is applied from an oscillator 102b to the vibrator 102a for applying a vibration to vibrate the rod-like elastic member 101, and this vibration becomes a progressive wave when it propagates through the rod-like elastic member 101. A movable member 104, which is in press contact with the rod-like elastic member 101, is driven by the progressive wave.

The vibration of the rod-like elastic member 101 is transmitted to the vibrator 103a via the transformer 103 for controlling a vibration, and the vibrator 103a converts the vibration energy into electric energy. A load 103b connected to the vibrator 103a consumes the electric energy, thereby absorbing the vibration. The transformer 103 for controlling a vibration suppresses reflection at the end face of the rod-like elastic member, thereby preventing generation of a standing wave in a characteristic mode of the rod-like elastic member 101.

In the linear vibration driven motor shown in FIG. 4, the rod-like elastic member 101 must have a length corresponding to the moving range of the movable member 104, and the entire rod-like elastic member 101 must be vibrated, thus increasing the size of the apparatus. In addition, the transformer 103 for controlling a vibration is required to prevent generation of a standing wave in the characteristic mode.

In order to solve the above-mentioned problems, various self-running vibration driven motors have been proposed. For example, a "hetero-degeneracy longitudinal L1—bending B4 mode plate motor" described in "222 Piezoelectric Linear Motors for Application to Driving a Light Pick-Up Element" in "Lecture Papers of 5th Electromagnetic Force Associated Dynamics Symposium" is known.

FIGS. 5A to 5C are views showing a conventional heterodegeneracy longitudinal L1—bending B4 mode plate motor, in which FIG. 5A is a front view, FIG. 5B is a side view, and FIG. 5C is a plan view.

An elastic member 1 has a rectangular planar shape, and driving force output portions 1a and 1b as projecting portions are formed on one surface of the member 1. The driving force output portions 1a and 1b are arranged at antinode positions of a bending vibration B4 mode generated in the elastic member 1, and are pressed against an object such as a guide rail 4 (see FIG. 7).

Electro-mechanical converting elements 2a and 2b are elements for converting electric energy into mechanical energy, and are adhered on the other surface of the elastic member 1. The elements 2a and 2b generate a longitudinal vibration L1 mode and a bending vibration B4 mode in the elastic member 1.

The operation principle of the motor shown in FIGS. 5A to 5C elucidated by the present inventor will be described below, and its problems will also be mentioned.

FIG. 6 is a view for explaining the driving principle of the hetero-degeneracy longitudinal L1—bending B4 mode plate motor shown in FIGS. 5A to 5C.

As shown in column (A) in FIG. 6, this vibration driven motor produces a compound vibration of bending and longitudinal vibrations by applying high-frequency voltages A and B to the two electro-mechanical converting elements 2a and 2b, thereby generating elliptic motions at the distal ends of the driving force output portions 1a and 1b, i.e., generating a driving force.

Note that G indicates the ground. Assume that the two electro-mechanical converting elements 2a and 2b are polarized in polarities in the same directions, and the high-frequency voltages A and B have a time phase difference of $\pi/2$ therebetween.

Column (A) in FIG. 6 shows time changes in two-phase high-frequency voltages A and B input to the vibration driven motor at times t1 to t9. The abscissa of column (A) represents the effective value of the high-frequency voltage. Column (B) shows the deformation state in the section of the vibration driven motor, i.e., time changes (t2 to t9) in bending vibration generated in the vibration driven motor. Column (C) shows the deformation state in the section of the vibration driven motor, i.e., time changes (t1 to t9) in longitudinal vibration generated in the vibration driven motor. Column (D) shows time changes (t1 to t9) in elliptic motion generated in the projecting portions 1a and 1b of the vibration driven motor.

The operation of the vibration driven motor will be described below in units of time changes (t1 to t9).

At time t1, as shown in column (A), the high-frequency voltage A generates a positive voltage, and similarly, the high-frequency voltage B generates a positive voltage having the same magnitude as that generated by the voltage A. As shown in column (B), bending vibrations produced by the high-frequency voltages A and B cancel each other, and mass points Y1 and Z1 have zero amplitudes. As shown in column (C), the high-frequency voltages A and B produce longitudinal vibrations in a direction to expand. Mass points Y2 and Z2 exhibit a maximum expansion to have a node X as the center, as indicated by an arrow in column (C). As a result, as shown in column (D), the two different types of vibrations are combined, so that the synthesis of motions of the mass points Y1 and Y2 becomes a motion of a mass point Y, and the synthesis of motions of the mass points Z1 and Z2 becomes a motion of a mass point Z.

At time t2, as shown in column (A), the high-frequency voltage B becomes zero, and the high-frequency voltage A generates a positive voltage. As shown in column (B), the high-frequency voltage A produces a bending motion, so that the mass point Y1 oscillates in the positive direction, and the mass point Z1 oscillates in the negative direction. As shown in column (C), the high-frequency voltage A produces a longitudinal vibration, and the mass points Y2 and Z2 contract to be smaller than those at time t1. As a result, as shown in column (D), the two different vibrations are combined, and the mass points Y and Z move clockwise from the positions at time t1.

At time t3, as shown in column (A), the high-frequency voltage A generates a positive voltage, and similarly, the high-frequency voltage B generates a negative voltage having the same magnitude as that generated by the voltage A. As shown in column (B), bending motions produced by the high-frequency voltages A and B are synthesized and amplified. The mass point Y1 is amplified in the positive direction as compared to that at time t2, and exhibits a maximum positive amplitude value. The mass point Z1 is amplified in the negative direction as compared to that at time t2, and exhibits a maximum negative amplitude value. As shown in column (C), longitudinal vibrations produced by the high-frequency voltages A and B cancel each other, and the mass points Y2 and Z2 return to their initial positions. As a result, as shown in column (D), the two different types of vibrations are combined, and the mass points Y and Z move clockwise from the positions at time t2.

At time t4, as shown in column (A), the high-frequency voltage A becomes zero, and the high-frequency voltage B generates a negative voltage. As shown in column (B), the high-frequency voltage B produces a bending motion. The amplitude of the mass point Y1 becomes smaller than that at time t3, and the amplitude of the mass point Z1 becomes smaller than that at time t3. As shown in column (C), the high-frequency voltage B produces a longitudinal vibration, and the mass points Y2 and Z2 contract. As a result, as shown in column (D), the two vibrations are combined, and the mass points Y and Z move clockwise from the positions at time t3.

At time t5, as shown in column (A), the high-frequency voltage A generates a negative voltage, and similarly, the high-frequency voltage B generates a negative voltage having the same magnitude as that generated by the voltage A. As shown in column (B), bending motions produced by the high-frequency voltages A and B cancel each other, and the mass points Y1 and Z1 have zero amplitudes. As shown in column (C), the high-frequency voltages A and B produce longitudinal vibrations in a direction to contract. The mass points Y2 and Z2 exhibit a maximum contraction to have the node X as the center, as indicated by an arrow in column (C). As a result, as shown in column (D), the two different types of vibrations are combined, and the mass points Y and Z move clockwise from the positions at time t4.

As the time elapses from t6 to t9, bending and longitudinal vibrations are produced in the same manner as in the above-mentioned principle, and as a result, as shown in column (D), the mass points Y and Z move clockwise and make elliptic motions.

With the above-mentioned principle, the vibration driven motor obtains a driving force by producing elliptic motions at the distal ends of the driving force output portions 1a and 1b. Therefore, when the distal ends of the driving force output portions 1a and 1b are in press contact with an object 4, as shown in FIG. 7, the elastic member 1 moves relative to the object 4.

However, the motor shown in FIGS. 5A to 5C can realize a driving operation in only one direction since the producing direction of the elliptic motions is determined depending on the size of the elastic member 1 and the adhered positions of the electro-mechanical converting elements 2a and 2b.

SUMMARY OF THE INVENTION

It is an object of the present invention to provide a vibration driven motor which can solve the above-mentioned problems, and can realize a two-dimensional driving operation by a simple arrangement.

In order to achieve the above object, according to the first aspect of the present invention, there is provided a vibration driven motor which comprises an elastic member and an electro-mechanical converting element connected to the elastic member, and the ultrasonic motor is characterized in that the driving direction is changed by changing the frequency of a vibration produced by the electro-mechanical converting element. In this case, the driving direction preferably includes two orthogonal directions.

According to the second aspect of the present invention, there is provided a vibration driven motor which comprises an elastic member and an electro-mechanical converting element connected to the elastic member, and the ultrasonic motor is characterized in that the elastic member has a first direction motion mode of making a motion in a first direction by a first mode vibration and a second mode vibration when a first driving signal is input to the electro-mechanical converting element, and a second direction motion mode of making a motion in a second direction by a third mode vibration and a fourth mode vibration when a second driving signal is input to the electro-mechanical converting element.

The elastic member preferably has a plurality of projecting portions, and the projecting portions are preferably aligned in a direction parallel to the first or second direction.

The mode orders of the first, second, third, and fourth mode vibrations and the frequencies of the first and second driving signals are appropriately set on the basis of the material, area, shape, and thickness of the elastic member. In this case, the material, area, shape, and thickness of the elastic member are preferably set, so that the mode order of the second mode vibration does not coincide with that of the fourth mode vibration. Alternatively, when the mode order of the second mode vibration is set to be equal to that of the fourth mode vibration, the first and second driving signals are preferably set to have different frequencies.

Furthermore, the first and third mode vibrations are preferably longitudinal vibrations, and the second and fourth mode vibrations are preferably bending vibrations. Alternatively, the first and third mode vibrations are preferably 1st-order longitudinal vibrations, the second mode vibration is preferably a 4th-order bending vibration, and the fourth mode vibration is preferably a 6th-order bending vibration.

According to the third aspect of the present invention, there is provided a vibration driven motor which comprises an elastic member and an electro-mechanical converting element connected to the elastic member, and changes a driving direction by changing the frequency of a vibration produced by the electro-mechanical converting element, and the vibration driven motor is characterized in that the motor has a plurality of driving force output portions for outputting driving forces, and the driving force output portions are arranged commonly to respective driving directions.

According to the fourth aspect of the present invention, there is provided a vibration driven motor which comprises an elastic member and an electro-mechanical converting element connected to the elastic member, produces a motion in a first direction by a first mode vibration and a second mode vibration generated in the elastic member in response to a first driving signal input to the electro-mechanical converting element, and produces a motion in a second direction by a third mode vibration and a fourth mode vibration generated in the elastic member in response to a second driving signal input to the electro-mechanical converting element, and the vibration driven motor is characterized in that a driving force output portion in the first direction and a driving force output portion in the second direction are arranged at intersections between antinode positions of the second and fourth mode vibrations so as to be commonly used in the two directions.

The first and third mode vibrations are preferably longitudinal vibrations, and the second and fourth mode vibrations are preferably bending vibrations. In this case, the second and fourth mode vibrations preferably have different mode orders. Alternatively, the first and third mode vibrations are preferably 1st-order longitudinal vibrations, the second mode vibration is preferably a 4th-order bending vibration, and the fourth mode vibration is preferably a 6th-order bending vibration.

According to the fifth aspect of the present invention, there is provided a vibration driven motor which comprises an elastic member and a plurality of electro-mechanical converting elements connected to the elastic member, and changes a driving direction by changing the frequencies of vibrations produced by the electro-mechanical converting elements, and the vibration driven motor is characterized in that the plurality of electro-mechanical converting elements are divided into groups in correspondence with driving directions, and output predetermined driving vibrations in units of groups.

The driving directions are preferably directions in which the electro-mechanical converting elements are disposed. Alternatively, when the electro-mechanical converting elements are divided into groups, the boundary line between adjacent groups is preferably substantially perpendicular to the corresponding driving direction.

According to the sixth aspect of the present invention, there is provided a vibration driven motor which comprises an elastic member, and first to fourth electro-mechanical converting elements connected to the elastic member, and changes a driving direction by changing the frequencies of vibrations produced by the electro-mechanical converting elements, and the vibration driven motor is characterized in that the motor forms a first group by electrically connecting the first and second electro-mechanical converting elements, and a second group by electrically connecting the third and fourth electro-mechanical converting elements, in response to a first control signal for instructing a motion in a first direction, and applies first driving signals having different phases to the first and second groups to generate first and second mode signals so as to produce the motion in the first direction; and the motor forms a third group by electrically connecting the first and third electro-mechanical converting elements, and a fourth group by electrically connecting the second and fourth electro-mechanical converting elements, in response to a second control signal for instructing a motion in a second direction, and applies second driving signals having different phases to the third and fourth groups to generate third and fourth mode signals so as to produce the motion in the second direction.

The first and third mode vibrations are preferably longitudinal vibrations, and the second and fourth mode vibrations are preferably bending vibrations. In this case, the second and fourth mode vibrations preferably have different mode orders. Alternatively, the first and third mode vibrations are preferably 1st-order longitudinal vibrations, the second mode vibration is preferably a 4th-order bending vibration, and the fourth mode vibration is preferably a 6th-order bending vibration.

In addition, the elastic member preferably comprises a non-polarized piezoelectric element.

According to the seventh aspect of the present invention, there is provided a vibration driven motor comprising: an elastic member; first to fourth electro-mechanical converting elements connected to the elastic member; a driving signal generation unit for generating a driving signal; a driving direction instruction unit; a grouping unit for, when the driving direction instruction unit instructs a first direction, forming a first group by electrically connecting the first and second electro-mechanical converting elements and a second group by electrically connecting the third and fourth electro-mechanical converting elements, and for, when the driving direction instruction unit instructs a second direction, forming a third group by electrically connecting the first and third electro-mechanical converting elements and a fourth group by electrically connecting the second and fourth electro-mechanical converting elements; and an input frequency instruction unit for, when the grouping unit forms the first and second groups, controlling the driving signal generation unit to apply first driving signals having different phases to the first and second groups, and for, when the grouping unit forms the third and fourth groups, controlling the driving signal generation unit to apply second driving signals having different phases to the third and fourth groups, and the vibration driven motor is characterized in that the elastic member makes a motion in the first direction by first and second mode vibrations produced upon application of the first driving signals, and makes a motion in the second direction by third and fourth vibrations produced upon application of the second driving signals.

The above and other objects, features and advantages of the present invention will be explained hereinafter and may be better understood by reference to the drawings and the descriptive matter which follows.

BRIEF DESCRIPTION OF THE DRAWINGS

FIGS. 1A, 1B, 1C, and 1D are respectively a plan view, a side view, a front view, and a bottom view illustrating an embodiment of a vibration driven motor according to the present invention by a trigonometric method;

FIG. 3 is a view for explaining the principle of driving the vibration driven motor according to the present invention in the X and Y directions;

FIG. 4 is a view showing a conventional linear vibration driven motor;

DETAILED DESCRIPTION OF THE PREFERRED EMBODIMENTS

FIGS. 1A, 1B, 1C, and 1D are respectively a plan view, a side view, a front view, and a bottom view illustrating a main body of an embodiment of a vibration driven motor according to the present invention by a trigonometric method.

The vibration driven motor of this embodiment comprises an elastic member 1, electro-mechanical converting elements 2a to 2d forming a matrix having rows and columns, and sliding members 3a to 3d, and the like.

The elastic member 1 is a planar member, and consists of a metal such as stainless steel, an aluminum alloy, or the like; a plastic material; or the like. In this embodiment, assume that the elastic member 1 has a thickness H, a length Wx, and a width Wy.

The four electro-mechanical converting elements 2a to 2d are adhered on the upper surface of the elastic member 1, and the four sliding members 3a to 3d are adhered on the lower surface thereof.

The electro-mechanical converting elements 2a to 2d are elements for converting electric energy into mechanical energy, and comprise, e.g., piezoelectric elements such as PZT, electrostrictive elements such as PMN, or the like.

The sliding members 3a to 3d are portions contacting an object (not shown), and are arranged at driving force output portions of the elastic member 1. Each of the sliding members 3a to 3d consists of an ethylene tetrafluoride resin (e.g., Teflon: the trade name of a product available from Du Pont Corp.), a plastic material containing molybdenum disulfide, or the like.

When frequency voltages are applied to the electro-mechanical converting elements 2a to 2d, the vibration driven motor makes elliptic motions at the adhered positions of the sliding members 3a to 3d on the elastic member 1, and makes a motion relative to the object (not shown) since the sliding portions 3a to 3d are in press contact with the object.

Figure 2:
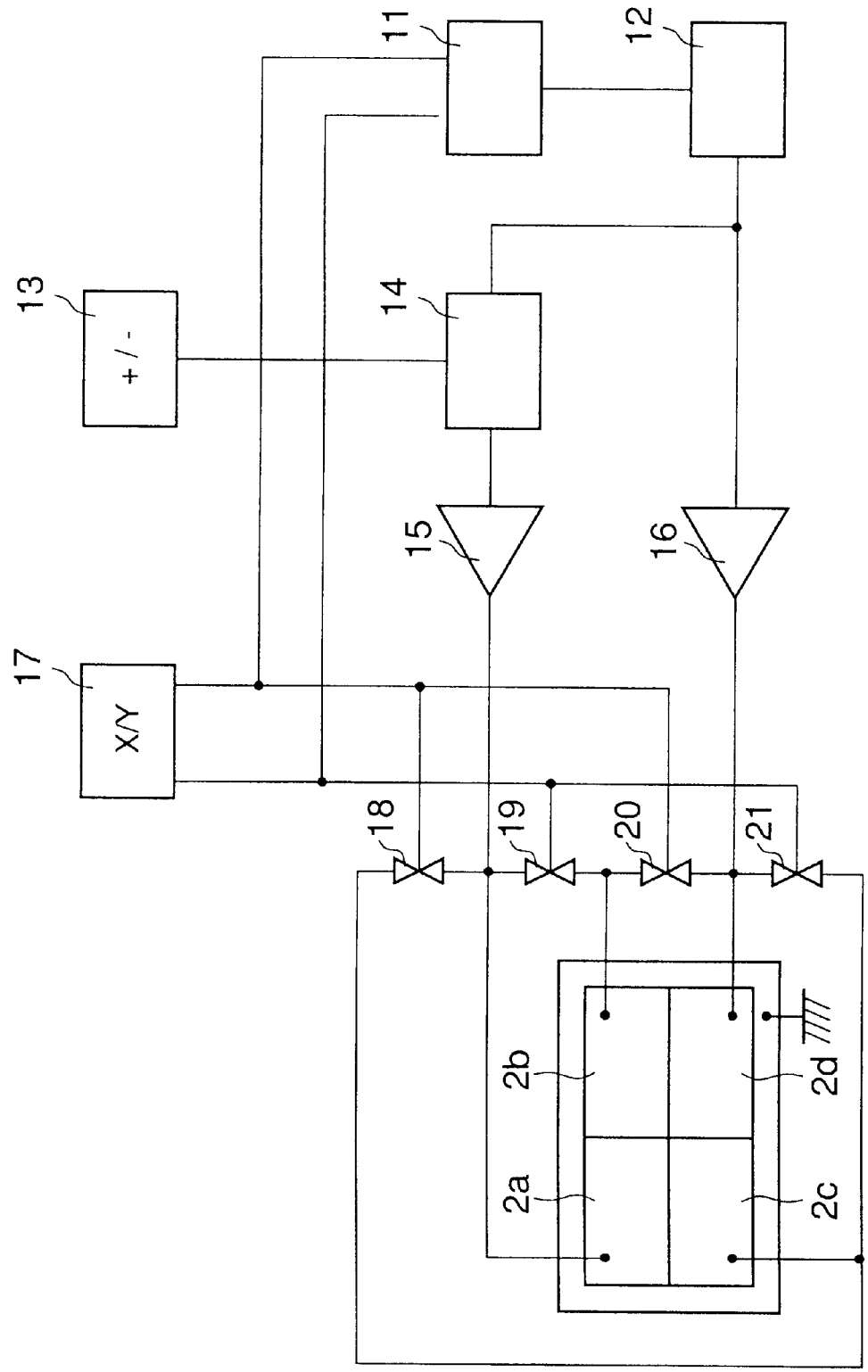
FIG. 2 is a block diagram showing a driving circuit of the vibration driven motor according to the present invention.
Figure 5B:
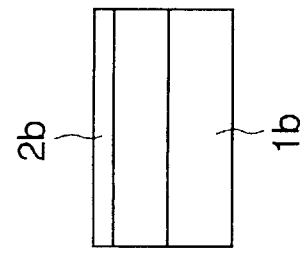
FIGS. 5A, 5B, and 5C are respectively a front view, a side view, and a plan view showing a conventional hetero-degeneracy longitudinal L1—bending B4 mode plate motor.
Figure 5A:
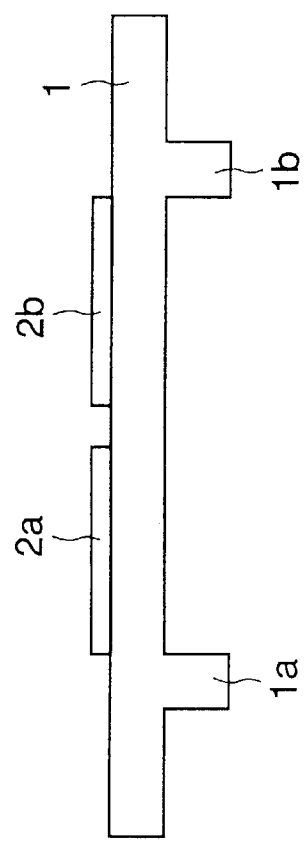
Figure 5C:
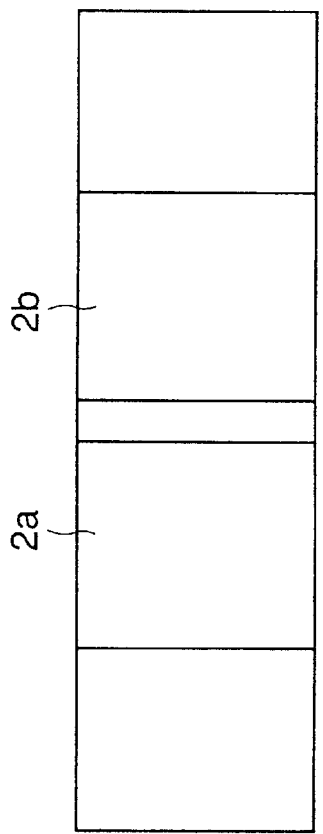
Figure 6:
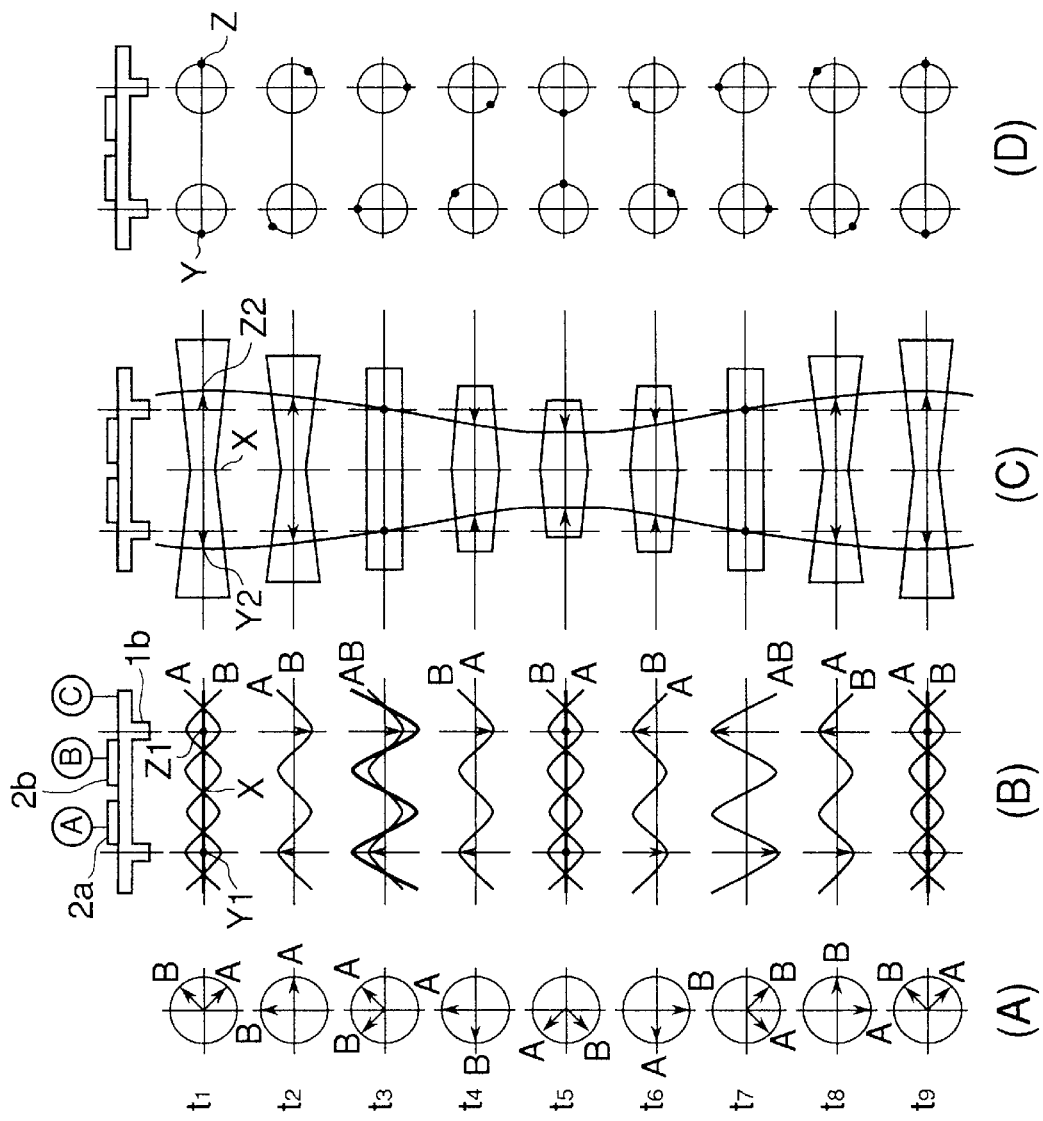
FIG. 6 is a view for explaining the driving principle of the hetero-degeneracy longitudinal L1—bending B4 mode plate motor shown in FIGS. 5A to 5C.
Figure 7:
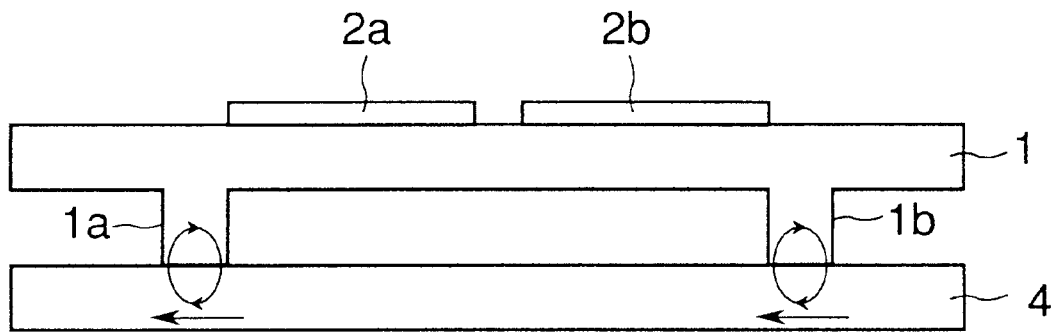
FIG. 7 is a view showing a relative movement state between the hetero-degeneracy longitudinal L1—bending B4 mode plate motor shown in FIGS. 5A to 5C and the object.

FIG. 2 is a block diagram showing a driving circuit of the embodiment of the vibration driven motor according to the present invention.

Referring to FIG. 2, the driving circuit includes an input frequency instruction unit 11, an oscillator 12, a phase shift instruction unit 13, a phase shifter 14, amplifiers 15 and 16, an X-Y direction instruction unit 17, and analog switches 18 to 21.

In this vibration driven motor, when the object is to be moved in the (+) direction of the (X) direction, the X-Y direction instruction unit 17 sets the (X) direction. The analog switches 18 and 20 are turned on, and the analog switches 19 and 21 are turned off to form a group consisting of the electro-mechanical converting elements 2a and 2c and a group consisting of the electro-mechanical converting elements 2b and 2d.

Then, the phase shift instruction unit 13 sets the (+) direction, and the phase shifter 14 sets a phase shift of $+\pi/2$. In this state, when the X-Y direction instruction unit 17 instructs the driving operation in the (X) direction to the input frequency instruction unit 11, the input frequency instruction unit 11 instructs the oscillator 12 to generate a first frequency signal.

When the oscillator 12 outputs the first frequency signal, the signal is amplified by the amplifier 16, and the amplified signal is input to the electro-mechanical converting elements 2b and 2d. Also, the phase of the first frequency signal is shifted by $+\pi/2$ by the phase shifter 14, and this signal is then amplified by the amplifier 15. The amplified signal is input to the electro-mechanical converting elements 2a and 2c.

In this manner, a 1st-order longitudinal vibration and a 6th-order bending vibration are produced in the elastic member 1, and these two different vibrations degenerate to produce elliptic motions at the adhered positions of the sliding members 3a to 3d on the elastic member 1, thereby producing a motion in the (+) direction of the (X) direction relative to the object.

On the other hand, in this vibration driven motor, when the object is to be moved in the (−) direction of the (X) direction, the X-Y direction instruction unit 17 sets the (X) direction. The analog switches 18 and 20 are turned on, and the analog switches 19 and 21 are turned off to form a group consisting of the electro-mechanical converting elements 2a and 2c and a group consisting of the electro-mechanical converting elements 2b and 2d.

Then, the phase shift instruction unit 13 sets the (−) direction, and the phase shifter 14 sets a phase shift of $-\pi/2$. In this state, when the X-Y direction instruction unit 17 instructs the driving operation in the (X) direction to the input frequency instruction unit 11, the input frequency instruction unit 11 instructs the oscillator 12 to generate a first frequency signal.

When the oscillator 12 outputs the first frequency signal, the signal is amplified by the amplifier 16, and the amplified signal is input to the electro-mechanical converting elements 2b and 2d. Also, the phase of the first frequency signal is shifted by $-\pi/2$ by the phase shifter 14, and this signal is then amplified by the amplifier 15. The amplified signal is input to the electro-mechanical converting elements 2a and 2c.

In this manner, a 1st-order longitudinal vibration and a 6th-order bending vibration are produced in the elastic member 1, and these two different vibrations degenerate to produce elliptic motions at the adhered positions of the sliding members 3a to 3d on the elastic member 1, thereby producing a motion in the (−) direction of the (X) direction relative to the object.

Furthermore, in this vibration driven motor, when the object is to be moved in the (+) direction of the (Y) direction, the X-Y direction instruction unit 17 sets the (Y) direction. The analog switches 19 and 21 are turned on, and the analog switches 18 and 20 are turned off to form a group consisting of the electro-mechanical converting elements 2a and 2b and a group consisting of the electro-mechanical converting elements 2c and 2d.

Then, the phase shift instruction unit 13 sets the (+) direction, and the phase shifter 14 sets a phase shift of $+\pi/2$. In this state, when the X-Y direction instruction unit 17 instructs the driving operation in the (Y) direction to the input frequency instruction unit 11, the input frequency instruction unit 11 instructs the oscillator 12 to generate a second frequency signal.

When the oscillator 12 outputs the second frequency signal, the signal is amplified by the amplifier 16, and the amplified signal is input to the electro-mechanical converting elements 2c and 2d. Also, the phase of the second frequency signal is shifted by $+\pi/2$ by the phase shifter 14, and this signal is then amplified by the amplifier 15. The amplified signal is input to the electro-mechanical converting elements 2a and 2b.

In this manner, a 1st-order longitudinal vibration and a 4th-order bending vibration are produced in the elastic member 1, and these two different vibrations degenerate to produce elliptic motions at the adhered positions of the sliding members 3a to 3d on the elastic member 1, thereby producing a motion in the (+) direction of the (Y) direction relative to the object.

Finally, in this vibration driven motor, when the object is to be moved in the (−) direction of the (Y) direction, the X-Y direction instruction unit 17 sets the (Y) direction. The analog switches 19 and 21 are turned on, and the analog switches 18 and 20 are turned off to form a group consisting of the electro-mechanical converting elements 2a and 2b and a group consisting of the electro-mechanical converting elements 2c and 2d.

Then, the phase shift instruction unit 13 sets the (−) direction, and the phase shifter 14 sets a phase shift of $-\pi/2$.

In this state, when the X-Y direction instruction unit 17 instructs the driving operation in the (Y) direction to the input frequency instruction unit 11, the input frequency instruction unit 11 instructs the oscillator 12 to generate a second frequency signal.

When the oscillator 12 outputs the second frequency signal, the signal is amplified by the amplifier 16, and the amplified signal is input to the electro-mechanical converting elements 2c and 2d. Also, the phase of the second frequency signal is shifted by $-\pi/2$ by the phase shifter 14, and this signal is then amplified by the amplifier 15. The amplified signal is input to the electro-mechanical converting elements 2a and 2b.

In this manner, a 1st-order longitudinal vibration and a 4th-order bending vibration are produced in the elastic member 1, and these two different vibrations degenerate to produce elliptic motions at the adhered positions of the sliding members 3a to 3d on the elastic member 1, thereby producing a motion in the (−) direction of the (Y) direction relative to the object.

FIG. 3 is a view for explaining the principle of driving the embodiment of the vibration driven motor of the present invention in the X and Y directions.

If the length Wx of the elastic member 1 is set to satisfy:

$$Wx = 32 \cdot \pi \cdot H/(12)^{1/2}$$

then, the resonance frequency, $\Omega L1X$, of the 1st-order longitudinal vibration is given by:

$$\Omega L1X = [\pi \cdot (E/\rho)^{1/2}]/(2 \cdot Wx)$$
$$= [(12 \cdot E/\rho)^{1/2}]/(64 \cdot H)$$

where E is the longitudinal elastic coefficient of the elastic member 1, and $\rho$ is the density of the elastic member 1.

The resonance frequency, $\Omega B6X$, of the 6th-order bending vibration is given by:

$$\Omega B6X = [16 \cdot \pi \cdot \pi \cdot (E \cdot I/\rho \cdot A)^{1/2}]/(Wx \cdot Wx)$$
$$= [(12 \cdot E/\rho)^{1/2}]/(64 \cdot H)$$

where I is the geometrical moment of inertia of the elastic member 1, and A is the sectional area of the elastic member 1. As is understood from these equations, the 1st-order longitudinal vibration and the 6th-order bending vibration match and degenerate.

Therefore, when a frequency of $[(12 \cdot E/\rho)^{1/2}]/(64 \cdot H)$ is input, the vibration driven motor is driven in the X direction (in the right-and-left direction of the plane of the drawing of FIG. 3).

Next, if the width Wy of the elastic member 1 is set to satisfy:

$$Wy = 72 \cdot \pi \cdot H/(12)^{1/2}$$

then, the resonance frequency, $\Omega L1Y$, of the 1st-order longitudinal vibration is given by:

$$\Omega L1Y = [\pi \cdot (E/\rho)^{1/2}]/(2 \cdot Wy)$$
$$= [(12 \cdot E/\rho)^{1/2}]/(144 \cdot H)$$

where E is the longitudinal elastic coefficient of the elastic member 1, and $\rho$ is the density of the elastic member 1.

The resonance frequency, $\Omega B4Y$, of the 4th-order bending vibration is given by:

$$\Omega B4Y = [16 \cdot \pi \cdot \pi \cdot (E \cdot I/\rho \cdot A)^{1/2}]/(Wy \cdot Wy)$$
$$= [(12 \cdot E/\rho)^{1/2}]/(144 \cdot H)$$

where I is the geometrical moment of inertia of the elastic member 1, and A is the sectional area of the elastic member 1. As is understood from these equations, the 1st-order longitudinal vibration and the 4th-order bending vibration match and degenerate.

Therefore, when a frequency of $[(12 \cdot E/\rho)^{1/2}]/(144 \cdot H)$ is input, the vibration driven motor is driven in the Y direction (the up-and-down direction of the plane of the drawing of FIG. 3).

Of course, since the input frequency $[(12 \cdot E/\rho)^{1/2}]/(64 \cdot H)$ for driving the motor in the X direction is different from the input frequency $[(12 \cdot E/\rho)^{1/2}]/(144 \cdot H)$ for driving the motor in the Y direction, one of the driving operation in the X direction and the driving operation in the Y direction can be selected.

Strictly speaking, the resonance frequencies must be calculated in consideration of the influences of the electro-mechanical converting elements 2a to 2d and the sliding members 3a to 3d. However, since these calculations are considerably complicated, a description thereof will be omitted herein.

In this embodiment, as shown in FIG. 3, the sliding members 3a to 3d are disposed at the intersection positions between the antinode positions of the 4th-order bending vibration (corresponding to a vibration in the third mode), B4, and the 6th-order bending vibration (corresponding to a vibration in the fourth mode), B6, to commonly use relative motion output portions in the X direction (corresponding to the first direction) and relative motion output portions in the Y direction (corresponding to the second direction).

Having described preferred embodiments of the present invention, it is to be understood that any variations will occur to those skilled in the art within the scope of the appended claims.

What is claimed is:

1. A vibration driven motor, comprising:
   an elastic member;
   a plurality of vibrating portions formed of electro-mechanical converting elements and disposed on said elastic member in such a manner that they form a matrix having rows and columns; and
   a driving circuit which simultaneously outputs a first drive signal and a second drive signal, whose phase differs from said first drive signal, in response to a first control signal instructing an output driving force to drive an object in a row direction and which simultaneously outputs a third drive signal and a fourth drive signal, whose phase differs from said third drive signal, in response to a second control signal instructing an output driving force to drive said object in a column direction,
   said driving circuit including a switch mechanism which simultaneously applies said first and second drive signals to first and second groups, respectively, of said vibrating portions in response to said first control signal and which simultaneously applies said third and fourth drive signals to third and fourth groups, respectively, of said vibrating portions in response to said second control signal, said first group of vibrating portions including first and second vibrating portions that are adjacent to each other in a column direction of said matrix;

said second group of vibrating portions including third and fourth vibrating portions that are adjacent to each other in a column direction of said matrix;

said third group of vibrating portions including said first and third vibrating portions that are adjacent to each other in a row direction of said matrix; and said fourth group of vibrating portions including said second and fourth vibrating portions that are adjacent to each other in a row direction of said matrix, wherein said first through fourth drive signals are AC signals and the frequency of said first drive signal differs from that of said third drive signal.

2. A motor according to claim 1, wherein first and second mode vibrations are generated in said elastic member by applying said first drive signal to each of vibrating portions included in said first group and by applying said second drive signal to each of vibrating portions included in said second group, and said output driving force in the row direction of said matrix is generated by said first and second mode vibrations, and third and fourth mode vibrations are generated in said elastic member by applying said third drive signal to each of vibrating portions included in said third group and by applying said fourth drive signal to each of vibrating portions included in said fourth group, and said output driving force in the column direction of said matrix is generated by said third and fourth mode vibrations.

3. A motor according to claim 2, wherein said first and third mode vibrations are longitudinal vibrations, and said second and fourth mode vibrations are bending vibrations.

4. A motor according to claim 3, wherein said second and fourth mode vibrations have different mode orders.

5. A motor according to claim 4, wherein said first and third mode vibrations are 1st-order longitudinal vibrations, said second mode vibration is a 4th-order bending vibration, and said fourth mode vibration is a 6th-order bending vibration.

6. A motor according to claim 1, wherein said elastic member is formed of a non-polarized piezoelectric element.

7. A motor according to claim 1, wherein said elastic member has a plurality of driving force output members which are shaped into protrusions, and each of said driving force output members is disposed at an intersection between antinode positions of said second and fourth mode vibrations.

* * * * *